United States Patent
Ness et al.

(10) Patent No.: US 11,127,283 B2
(45) Date of Patent: Sep. 21, 2021

(54) SYSTEMS AND METHODS TO PREVENT CARWASH COLLISIONS

(71) Applicant: DRB Systems, LLC, Akron, OH (US)

(72) Inventors: Pete Ness, Boise, ID (US); Richard A. Johnson, II, Boise, ID (US); Robert W. Kaiser, Boise, ID (US)

(73) Assignee: DRB Systems, LLC, Akron, OH (US)

( * ) Notice: Subject to any disclaimer, the term of this patent is extended or adjusted under 35 U.S.C. 154(b) by 351 days.

(21) Appl. No.: 15/659,292

(22) Filed: Jul. 25, 2017

(65) Prior Publication Data

US 2018/0025624 A1 Jan. 25, 2018

Related U.S. Application Data

(60) Provisional application No. 62/366,363, filed on Jul. 25, 2016.

(51) Int. Cl.
*B60S 3/04* (2006.01)
*G08B 29/26* (2006.01)
(Continued)

(52) U.S. Cl.
CPC ............ *G08B 29/26* (2013.01); *B25J 9/0093* (2013.01); *G06T 7/246* (2017.01); *G06T 7/251* (2017.01); *G06T 7/292* (2017.01); *G08B 29/04* (2013.01); *H04N 13/111* (2018.05); *B60S 3/04* (2013.01); *G06T 2207/10016* (2013.01); *G06T 2207/20081* (2013.01); *G06T 2207/30236* (2013.01); *G06T 2207/30261* (2013.01)

(58) Field of Classification Search
CPC .. B60S 3/004; B60S 3/04; B60S 3/041; B60S 3/042; B60S 3/06; B60S 3/063; B60S 3/066; G08B 29/04; G08B 29/26; G06T 7/246; G06T 7/251; G06T 7/292; G06T 2207/10016; G06T 2207/20081; G06T 2207/30236; G06T 2207/30261; H04N 13/11; B25J 9/0093
See application file for complete search history.

(56) References Cited

U.S. PATENT DOCUMENTS 4,893,229 A    1/1990  Detrick
5,036,474 A *  7/1991  Bhanu ................ G06K 9/00791
                                                348/117

(Continued)

FOREIGN PATENT DOCUMENTS

CN    201 545000 U    8/2010
DE       4131786 A1   3/1993
(Continued)

OTHER PUBLICATIONS

Machine Translation of Yoon et al., KR-20080109173-A, Dec. 2008. (Year: 2008).*
Machine Translation of DE 4131786 A1, Mar. 1993. (Year: 1993).*

*Primary Examiner* — David G Cormier
(74) *Attorney, Agent, or Firm* — Schlue IP Law; Daniel J. Schlue

(57) ABSTRACT

Disclosed systems and methods prevent collisions in a carwash property. Disclosed systems and methods include software that brings together computer vision and machine learning algorithms to track the interaction of vehicles and equipment within the environment of a carwash to improve safety and optimize production.

4 Claims, 5 Drawing Sheets

(51) Int. Cl.
  *G08B 29/04* (2006.01)
  *B25J 9/00* (2006.01)
  *G06T 7/246* (2017.01)
  *H04N 13/111* (2018.01)
  *G06T 7/292* (2017.01)

(56) References Cited

U.S. PATENT DOCUMENTS

| | | | |
|---|---|---|---|
| 5,280,530 A * | 1/1994 | Trew | G01S 3/7864 |
| | | | 348/14.16 |
| 5,901,398 A * | 5/1999 | Ishikawa | B60S 3/004 |
| | | | 104/165 |
| 6,264,754 B1 * | 7/2001 | Bowman | B60S 3/063 |
| | | | 134/6 |
| 6,277,207 B1 | 8/2001 | Gauthier | |
| 6,709,530 B1 | 3/2004 | Dietsch et al. | |
| 6,718,216 B2 | 4/2004 | Grier | |
| 7,617,832 B2 | 11/2009 | MacDowell | |
| 7,764,196 B2 | 7/2010 | Spears | |
| 8,024,834 B2 | 9/2011 | MacNeil | |
| 8,049,643 B2 * | 11/2011 | Ness | G08G 1/0175 |
| | | | 134/123 |
| 8,593,302 B2 | 11/2013 | Auer | |
| 8,813,765 B2 | 8/2014 | Petit | |
| 9,132,807 B2 | 9/2015 | Stadler | |
| 9,139,166 B2 | 9/2015 | Belanger et al. | |
| 2005/0279385 A1 | 12/2005 | Grier et al. | |
| 2008/0060150 A1 | 3/2008 | Dollhopf | |
| 2009/0010546 A1 * | 1/2009 | Rossato | G06K 9/38 |
| | | | 382/199 |
| 2009/0250086 A1 * | 10/2009 | Belanger | B60S 3/004 |
| | | | 134/57 R |
| 2010/0186778 A1 | 7/2010 | Martin | |
| 2013/0239992 A1 | 9/2013 | Detrick | |
| 2014/0232566 A1 * | 8/2014 | Mimeault | G01S 17/86 |
| | | | 340/935 |
| 2015/0273531 A1 * | 10/2015 | Oliver | B60S 3/004 |
| | | | 134/18 |
| 2016/0059831 A1 | 3/2016 | Belanger et al. | |
| 2016/0264104 A1 * | 9/2016 | Belanger | B60S 3/002 |

FOREIGN PATENT DOCUMENTS

| | | |
|---|---|---|
| JP | 2004203253 A | 7/2004 |
| JP | 5251725 B2 | 7/2013 |
| KR | 20080109173 A * | 12/2008 |

* cited by examiner

SYSTEMS AND METHODS TO PREVENT CARWASH COLLISIONS

CROSS-REFERENCE TO RELATED APPLICATIONS

This application, under 35 U.S.C. § 119, claims the benefit of U.S. Provisional Patent Application Ser. No. 62/366,363 filed on Jul. 25, 2016, and entitled "Car Wash Pileups Prevention System," the contents of which are hereby incorporated by reference herein.

FIELD OF THE DISCLOSURE

This disclosure relates to systems and methods for avoiding collisions, or pileups, at a carwash. More particularly, this disclosure relates to computer controlled machine vision and machine learning systems and methods that monitor, detect, and respond to events in and around a carwash facility.

BACKGROUND

The exterior carwash industry has moved more and more towards automated systems, and having customers ride through the wash tunnels in their vehicles. Typically, the customer drives on to a conveyor, rides through the wash tunnel, and drives out. Usually, the vehicle should be in neutral, with customer's hands off the steering wheel during the wash, but sometimes problems arise. For example, if a vehicle has problems during the wash, and jumps a roller on the conveyor, it may collide with another vehicle, or piece of carwash equipment. If no carwash employee notices this, and the conveyor is not stopped, additional vehicles can be involved, causing damaging and expensive pileups.

Other potentially adverse events may also occur on at a carwash facility. For example, a carwash conveyor is usually either a chain and roller system, or a belt and cleat (or flight) system, and the vehicle's tires are intended to engage the roller or cleat to propel the vehicle through the wash tunnel. However, an adverse event may occur if the tire "hops" the cleat or roller, meaning that a vehicle that fails to move forward at the rate of the cleat or roller can fall behind its proper location while the cleat or roller is pulled forward under the wheel of the vehicle. This "hopping" may occur for a variety of reasons, such as, the driver applied the brakes stopping their forward motion, the vehicle was placed into park, drive, reverse, or any other gear that would change the vehicle's motion, the steering wheel was turned causing friction with the track or other wash equipment, vehicle movement was changed by impact with wash equipment, such as grill brushes or mitters, the vehicle's collision detection system was activated and brakes were automatically applied, the vehicle's automatic breaking system was activated, or the like.

Another potentially adverse event may occur if there is an undesired, temporary gain in the vehicle's forward momentum. A vehicle can pick up speed as it travels through a carwash giving it undesired forward momentum commonly referred to as bounce. For example, bounce may cause a vehicle to temporarily be ahead of its expected position, and then returns to its expected position as momentum is lost and the conveyor catches up to the vehicle.

Bounce may occur when a combination of factors are present, though not all factors must be present to create bounce. For example, factors creating bounce may be if a vehicle is relatively light in weight in comparison to other vehicles and, therefore, does not have the downward inertia to slow forward movement in the tunnel, if a vehicle rolls forward due to slope of the wash tunnel floor, if a vehicle is pushed forward by the roller, or tunnel equipment, such as brushes, that increase the forward momentum of the vehicle, the driver of a vehicle may apply the break and/or transmission in the wash tunnel in a manner that temporarily delays the vehicle's forward momentum, resulting in a sudden release of energy when forced forward by the conveyor, the vehicle may have oversized tires which fail to stay in alignment due to friction, and other factors.

Bounce can result in forward movement capable of causing a collision with the vehicle(s), or equipment, in front of the bouncing vehicle. However, some amount of bounce may be acceptable, and can be accounted for by the disclosed systems and methods.

Other causes of potentially adverse events may include insufficient distance between vehicles, a failed load-on where the vehicle was loaded improperly onto the conveyor in a manner that cannot safely allow additional vehicles to be loaded on to the conveyor, undesired vehicle-powered forward movement, premature vehicle-powered exit from the wash tunnel, a vehicle obstructing the wash tunnel exit, wash tunnel equipment malfunction, or the like.

Other drawbacks, disadvantages, or limitations of current systems and methods may also exist.

SUMMARY

Accordingly, systems and methods for enabling a conveyor stop event and otherwise avoid potential damage from an adverse carwash events are disclosed.

The disclosed collision prevention systems provide superior replacements to the systems that solely implement photoelectric eye activation by, among other things, tracking the entire path of the vehicle instead of one point at the entrance/exit. Likewise, the disclosed collision prevention systems are not limited to tracking within the wash tunnel and, therefore, can augment exit tracking from the wash tunnel exit to the vehicle's exit from the property. Other advantages and benefits of the disclosed systems and methods also exist.

Accordingly, disclosed systems include a system having a wash tunnel including a conveyor and wash equipment, at least one vision device having a field of view that includes at least a portion of the wash tunnel, and a central controller including a tracking system, and a wash tunnel control system, and wherein the tracking system communicates with the at least one vision device and the wash tunnel control system to control the conveyor based upon events observed in the field of view.

In some embodiments, the tracking system further may include a modeling module that creates a model of a wash tunnel path.

In some embodiments, the tracking system further may include a notification module that provides a notification upon the occurrence of an event.

In some embodiments, the tracking system further may include a tracking module that tracks motion in the wash tunnel. In further embodiments, the tracking module further includes unique point identification to track motion. In still further embodiments, the tracking module further includes unique point variance over time to track motion. In further embodiments, the tracking module further may include a location module, a measuring module, and a point identification module, and wherein an identified point is located and measured on a path through a defined field of vision.

In further embodiments, the tracking module further may include a known image module that stores known vehicle images, and wherein the known vehicle images are used to generate a mask template.

In further embodiments, the tracking module further may include an exclusion module that masks regions in the wash tunnel.

In further embodiments, the tracking module further may include a machine learning module that excludes regions in the wash tunnel based on prior collected data.

In further embodiments, the tracking module further may include a location module, a measuring module, a point identification module, and a stereoscopic module that creates stereoscopic vision from the at least one vision device by using location and measurements of an identified point as it progresses through the field of view.

In some embodiments, the wash tunnel control system controls the operation of the wash equipment based at least in part on communications from the tracking system.

In some embodiments, the wash tunnel control system controls further may include a drive motor module, an emergency module, a system interface, a trigger module, and a display interface. In further embodiments, the wash tunnel control system controls further may include one or more of an audio interface, a queuing interface, a point-of-sale (POS) interface, or a 3rd party interface.

In further embodiments, the display interface communicates with at least one indicator that indicates a condition within the wash tunnel. In still further embodiments, the audio interface communicates with at least one indicator that indicates a condition within the wash tunnel.

Disclosed embodiments also include a method including detecting a vehicle's entry into a wash tunnel with a first vision device, identifying a point on the vehicle, monitoring the identified point on the vehicle for flow through a field of vision of the first vision device, and filtering the flow through the field of vision against a modeled path through the wash tunnel.

In some embodiments, the method may further include detecting the vehicle's entry into a field of vision of a second vision device, monitoring the identified point on the vehicle for flow through the field of vision of the second vision device, and filtering the flow through the field of vision against a modeled path through the wash tunnel.

In further embodiments, the method may further include verifying a location of the vehicle against the modeled path through the wash tunnel, and if unable to verify, signaling the occurrence of a potentially adverse event.

In further embodiments, the method may include signaling the occurrence of a potentially adverse event by issuing a stop conveyor signal.

Figure 1:
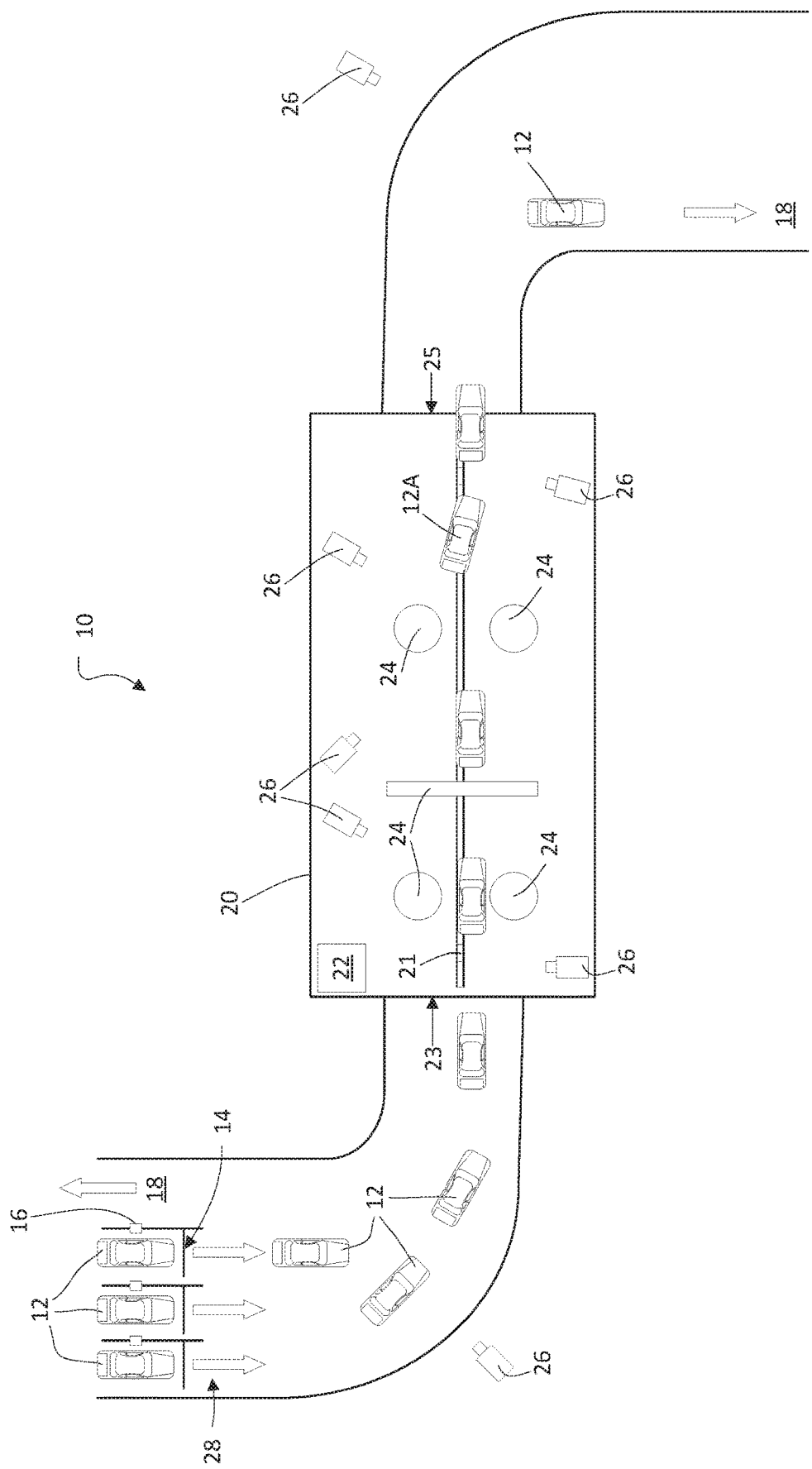
FIG. 1 is schematic, aerial-view representation of a car-wash collision prevention system in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

FIG. 1 is schematic, aerial-view representation of a car-wash collision prevention system 10 in accordance with disclosed embodiments. While a particular layout for system 10 is shown, others are, of course, possible and more, or less, features, drive paths, and equipment may be part of system 10 as would be understood by those of ordinary skill in the art. As shown, one or more vehicles 12 may enter the system 10 through one or more entry lanes 28. System 10 may include one or more gates 14 to assist with control of vehicle 12 traffic. System 10 may also include one or more input stations 16 that may, among other things, enable users to select wash services, make payments, function as a point-of-sale (POS) device, or the like. As also shown, system 10 may include one or more exit lanes 18 to facilitate vehicle 12 traffic through the system 10. In some embodiments, an exit lane 18 may be placed near entrance lane(s) 28 to facilitate users that change their mind, unexpectedly exit, or the like, and wish to exit the system 10 without receiving service.

As also shown, system 10 may include a wash tunnel 20. As used herein, wash tunnel 20 generally refers to an area where a vehicle 12 can be washed or serviced and is not specifically limited to an enclosed tunnel, but can also include an area that is not enclosed, or not in the form of a tunnel as well as any other system for servicing or washing a vehicle as would be apparent to those of ordinary skill in the art.

Wash tunnel 20 may comprise a conveyor 21 to facilitate movement of vehicles 12 through the wash tunnel 20. Conveyor 21 may be a chain and roller conveyor, a belt and cleat conveyor, or any other suitable mechanism for controllably moving vehicles 12 through the wash tunnel 20.

System 10 also includes a central controller 22. Central controller 22 may be any suitable programmable logic controller. For example, central controller 22 may comprise a special purpose logic controller, a general purpose logic controller (e.g., a computer), or the like. Central controller 22 may be located at any suitable location either within wash tunnel 20, or in a remote office, or other location, with appropriate climate controls, communication systems, and the like. Central controller 22 is configured to control the equipment in wash tunnel 20 (or tunnels 20 for embodiments where there is more than one tunnel 20) as described herein. Likewise, while one central controller 22 is shown in FIG. 1, the system 10 may have more than one computer, a distributed network of computers, or the like for controlling the wash tunnels 20.

As also shown, wash tunnel 20 generally comprises an entrance 23, an exit 25, and one or more pieces of wash equipment 24. Wash equipment 24 may comprise, brushes, sprayers, dispensers, blowers, mitters, or the like, as would be understood by one of ordinary skill in the art.

System 10 may also include one or more vision devices 26. Vision devices 26 may comprise any device, or collaboration of devices, capable of capturing the shape, size, motion, or color of a three-dimensional body that can be used as a vision input device for a vehicle tracking system. For example, vision devices 26 may comprise cameras (digital, analog, or analog to digital feed), photoelectric sensors, ultrasonic sensors, LIDAR, RADAR, SONAR, or the like.

Other components of system 10 may comprise an enter eye such as a photoelectric sensor to trigger the wash cycle. Some systems 10 may also use the same photoelectric sensors to calculate vehicle length and height. As discussed below, a vehicle tracking system 202 may read enter eye data to confirm and/or augment vehicle 12 tracking data. System 10 may also include an exit eye such as a photoelectric transmitter/receiver pair to ensure that vehicles 12 clear the tunnel exit 25 before the next vehicle 12 is moved into place.

In the following disclosure the operation and function of the central controller 22 is described. In general, central controller 22 may comprise at least one processor and memory storing instructions causing data to be transmitted to one or more connected systems to cause the connected system(s) to selectively change.

Software or program modules are also described that store and execute instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable by a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, modules, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented within a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

Figure 2:
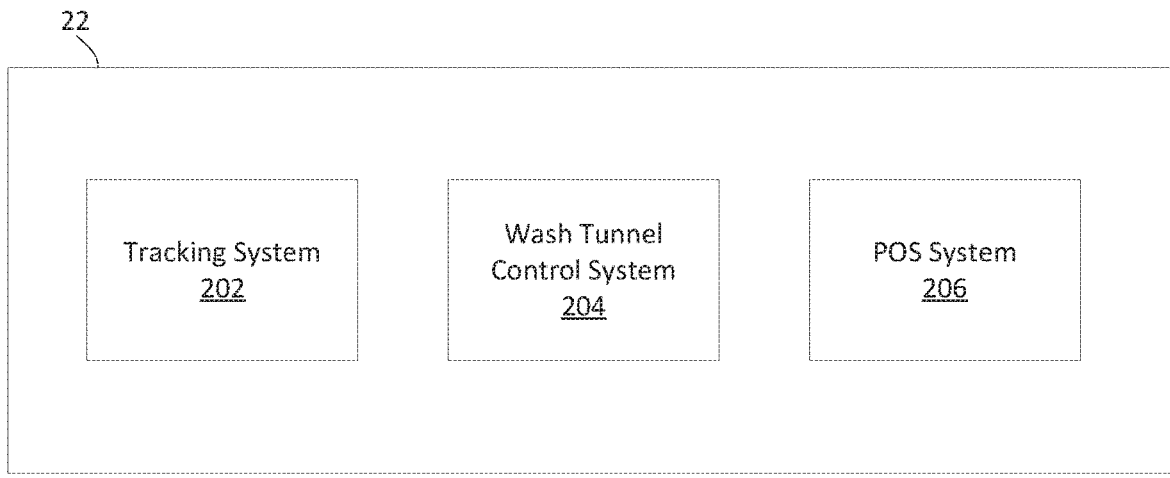
FIG. 2 is a schematic representation of systems of a central control computer in accordance with disclosed embodiments.

FIG. 2 is a schematic representation of systems of central controller 22 in accordance with disclosed embodiments. As shown, system 10 may include a tracking system 202. One example of a tracking system is disclosed in the inventor's U.S. Pat. No. 8,049,643, titled "Vehicle Tracking System For Vehicle Washing," which is hereby incorporated herein by reference in its entirety.

Figure 3:
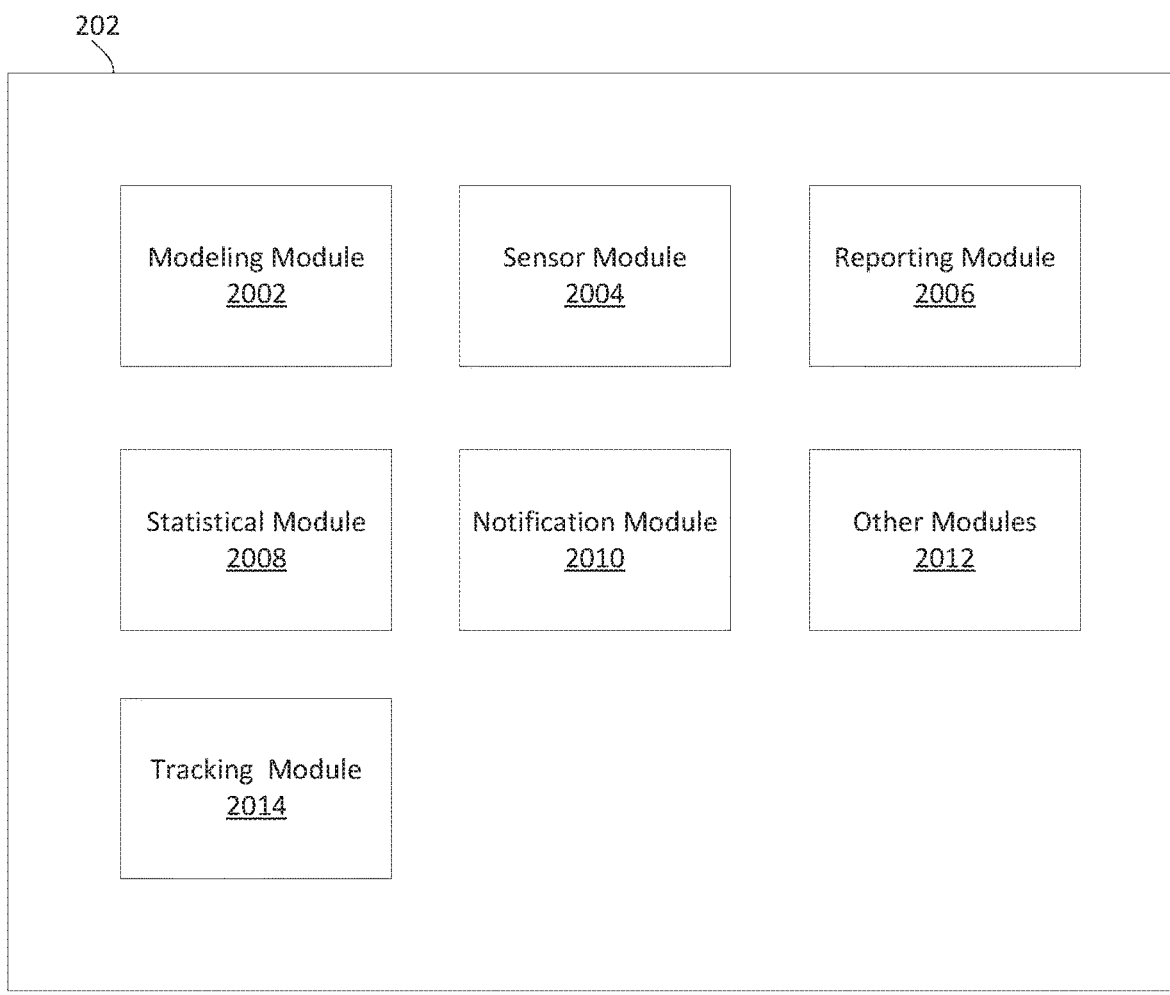
FIG. 3 is a schematic representation of modules within a tracking system in accordance with disclosed embodiments.

FIG. 3 is a schematic representation of modules within a tracking system 202 in accordance with disclosed embodiments. As shown, tracking system 202 may comprise a modeling module 2002, a sensor module 2004, a reporting module 2006, a statistical module 2008, a notification module 2010, and other modules 2012.

Among other things, tracking system 202, via modelling module 2002, creates a virtual model of vehicles 12, paths, and progress through wash tunnel 20. Modelling module 2002 may also create a virtual model of wash tunnel 20 equipment 24, obstructions, water flow, and other components or conditions. The various modeled components are used to monitor for potentially adverse conditions and to appropriately respond to the same.

Tracking system 202 may also comprise a sensor module 2004 for, among other things, storage of sensor data (e.g., vision device 26 data) for an adverse event. Tracking system 202 may also comprise a reporting module 2006 for reporting of sensor data for tracking and system 10 optimization. Tacking system 202 may also comprise a statistical module 2008 for statistical remote monitoring of wash tunnel 20 activity to provide a scheme of preventive measures and interventions for system 10 operation.

Tracking system 202 may also comprise a notification module 2010 for real time notification of system 10 events. For example, notification module 2010 may have a smart vehicle module to identify and notify an operator of the appearance of vehicle 12 with smart feature(s) (e.g., anti-collision automatic braking, or the like) capable of causing an adverse event. Notification module 2010 may communicate with the wash tunnel control system 204 to enact counter measures due to the presence of a smart vehicle 12. Notification module 2010 may also track and notify when other events occur. For example, notification module 2010 may send an alert through another device (e.g., a smartphone or the like) based upon the occurrence of a wash tunnel 20 event.

Tracking system 202 may also comprise a tracking module 2014 for communicating with the various vision devices 26. In addition, tracking module 2014 may use data from a vision device 26, or collaboration of devices 26, to identify and interpret data related to the motion of an object (e.g., a vehicle 12).

Embodiments of tracking system 202 may perform one or more roles, including: detection, identify the presence of an object, measurement, measure the dimensions of an object, position, identify the location of an object within a three-dimensional space, speed, calculate the speed of an object passing through a three-dimensional space, calculating the speed of an object using a single vison device 26 for an object moving along a fixed plane, direction, calculate the movement along three axes (x, y, z) of an object passing through a three-dimensional space, acceleration, calculate the acceleration of an object passing through a three-dimensional space, handoff, identify the relative accuracy of motion tracking with relation to a second motion tracker system to delegate responsibility of tracking motion to the tracker with a greater confidence interval, and other roles.

Embodiments of tracking system 202 may track motion using one or more methods to identify and persistently track an object. For example, tracking module 2014 may identify unique points which can be used as correlative markers for an object (e.g., vehicle 12) moving through a three-dimensional space.

Embodiments of tracking system 202 may also track motion by tracking of unique identification point movement or "flow." For example, tracking module 2014 may calculate the delta (e.g., variance) of a unique point over a period of time within a field of view.

Embodiments of tracking system 202 may also track motion by using multiple data sets to create stereoscopic vision from a monocular source (e.g., a single vision device 26). For example, tracking by using location and measurements of points as they progress through a field of view in correlation with known distance and size data to create a stereoscopic data set sufficient to calculate the size and shape of a three-dimensional object (e.g., vehicle 12).

Embodiments of tracking system 202 may also track motion by use of a known target within a fixed range to calibrate a field for distortion, or by use of multiple vision devices 26 to verify and refine a data model.

Embodiments of tracking system 202 may also track motion by use of a known image (e.g., a database of known vehicle 12 images) to generate a mask template. For example, tracking system 202 may use of a set of visual data to extract background information from a second set of visual data.

Embodiments of tracking system 202 may also track motion by tracking isolation of a moving vehicle 12 through a region using methods of exclusion and inclusion. For example, exclusion may include manual exclusion masking of fixed regions as defined by a coordinate based container, or dynamically excluded regions based on statistical variance (fly away).

In addition, tracking system 202 may machine learn to exclude regions. For example, exclusion may be based on region matches to background image(s) learned by system 202, region is invalid for time of day (e.g., too much sun, or the like) learned by system 202, region is invalid for environmental cause (e.g., fog, soap, water, etc.) learned by system 202, region is invalid for physical properties (e.g., shape, structures, etc.) learned by system 202, region is invalid for motion properties (e.g., spinning motion, etc.) learned by system, or the like. Likewise, tracking system 202 may dynamically include regions based on machine learning in a similar fashion.

Embodiments of tracking system 202 may identify matches known characteristics of a vehicle 12 including: size(s), shape(s), unique point pattern(s), color(s), or the like. Tracking system 202 may also perform vehicle 12 make and model correlations to vehicle(s) 12 within a dictionary of values within a confidence level.

Embodiments of tracking system 202 may analyze whether a vehicle 12 matches characteristics of a vehicle 12 already identified by a previous vision device 26 within the live data set (e.g., a vehicle 12 currently in wash tunnel 20). Tracking system 202 may also handoff a vehicle by a coordinated transfer of the authoritative role of tracking a vehicle 12 from one vision device 26 to another which achieves a higher level of confidence in tracking the vehicle 12.

System 10 may also include a wash tunnel control system 204. The wash tunnel control system 10 is responsible for the normal operation of all standard automatic carwash functions as disclosed herein. Embodiments of the vehicle tracking system 202 may interface with the wash tunnel control system 204.

Figure 4:
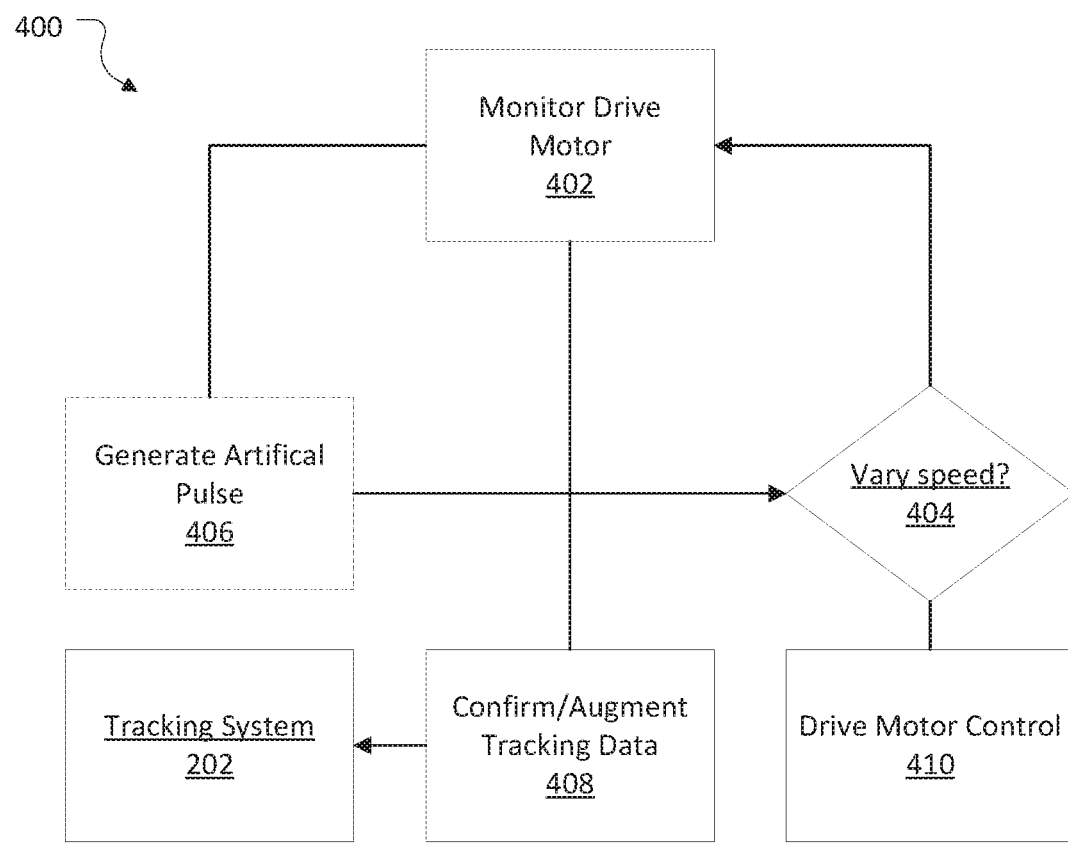
FIG. 4 is a schematic illustration of an embodiment of a drive motor module in accordance with the disclosure.
Figure 5:
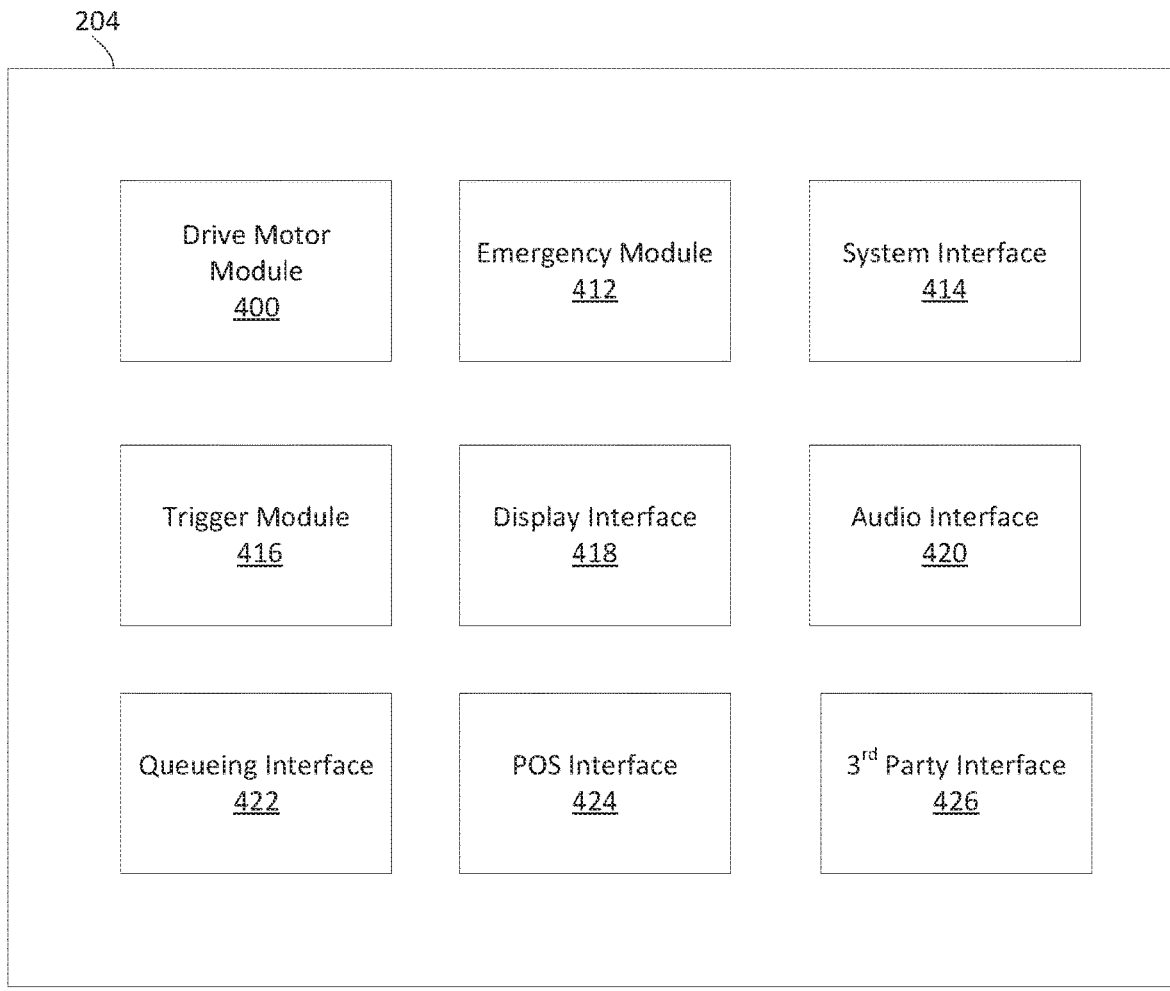
FIG. 5 is a schematic representation of modules within a wash tunnel control system in accordance with disclosed embodiments.

Wash tunnel control system 204 may also include modules for components of the wash tunnel 20, such as the wash equipment 24, conveyor 21, and the like. For example, wash tunnel control system 204 may include a drive motor module 400 (FIG. 4) to control conveyor 21 as it propels vehicles 12 through the wash tunnel 20. Various embodiments of the drive motor exist and may comprise hydraulic systems in addition to electric systems. FIG. 4 is a schematic illustration of an embodiment of a drive motor module 400 in accordance with the disclosure. As shown, drive motor module 400 may monitor a drive motor at 402 to monitor and estimate the conveyor 21 speed. Monitoring may be accomplished in any suitable fashion. For example, the speed of the motor may be measured directly, may be measured as a pulse using an inductive pickup on a drive sprocket, may be measured based on hydraulic flow, or other suitable method. In some embodiments, wash tunnel control system 204, via drive motor control module 400, can optionally generate an artificial drive motor pulse at 406 when the primary pulse cannot be, or is not convenient to read. If, as a result of the monitoring at 402, an indication to vary the conveyor 21 speed occurs at 404, then the wash tunnel control system 204 will signal appropriate systems to cause the drive motor at 410 to vary in accordance with the indication. Actual conveyor 21 speed can vary depending on the pulse calibration, chain lengthening with age and wear, or due to other factors. As indicated at 408, embodiments of the wash tunnel control system 204 may communicate with the tracking system 202 by communicating the drive motor pulses to confirm and/or augment vehicle tracking data. Other uses for the drive motor pulse data are also possible.

Embodiments of the wash tunnel control system 204 may also be in communication, via emergency module 412, with multiple emergency stop buttons located at convenient locations throughout system 10. For example, stop buttons may be located in the wash tunnel 20, in an office, at the tunnel entrance 23 or exit 25, or the like, each button capable or interrupting the wash tunnel's 20 normal operations. Communications between the tracking system 202 and the wash tunnel control system 204 may trigger a system 10 stop when a potential collision is detected, or the like.

Wash tunnel control system 204 may also comprise a tunnel control system interface 414 with a network connection for communication over a networking protocol to a system designed to operate as a tunnel control system. The network connection may be an analog to digital connection for communication from a digital device capable of monitoring the analog electric impulses of a tunnel control system 204, a digital to analog connection for communication with a digital device capable of triggering an analog electric impulse simulating the commands of a tunnel control system 204, or a combination of the foregoing.

Wash tunnel control system 204 may also comprise a trigger stop module 416 for initiating an emergency stop of the conveyor 21 by signaling the tunnel control system 204. Wash tunnel control system 204 may also comprise a display system interface 418 which includes monitoring the vehicle tracking system 202 and producing status information using lights, panel indicators, or displays. Likewise, wash tunnel control system 204 may also comprise an audio system interface 420 for monitoring the vehicle tracking system 202 and producing audible information using bells, sirens, loudspeakers, or buzzers.

Wash tunnel control system 204 may also comprise a queueing system interface 422 enabling bidirectional communication and control between a vehicle tracking system 202 and a video queueing system as defined in U.S. Pat. No. 8,049,643.

Wash tunnel control system 204 may also comprise a point of sale (POS) system interface 424 enabling bidirectional communication and control between vehicle tracking system 202 and POS system 206. Embodiments of wash tunnel control system 204 may also comprise a 3rd party sensor interface 426 for gathering data from a sensor used in the operation of an automatic car wash system.

Figure 6:
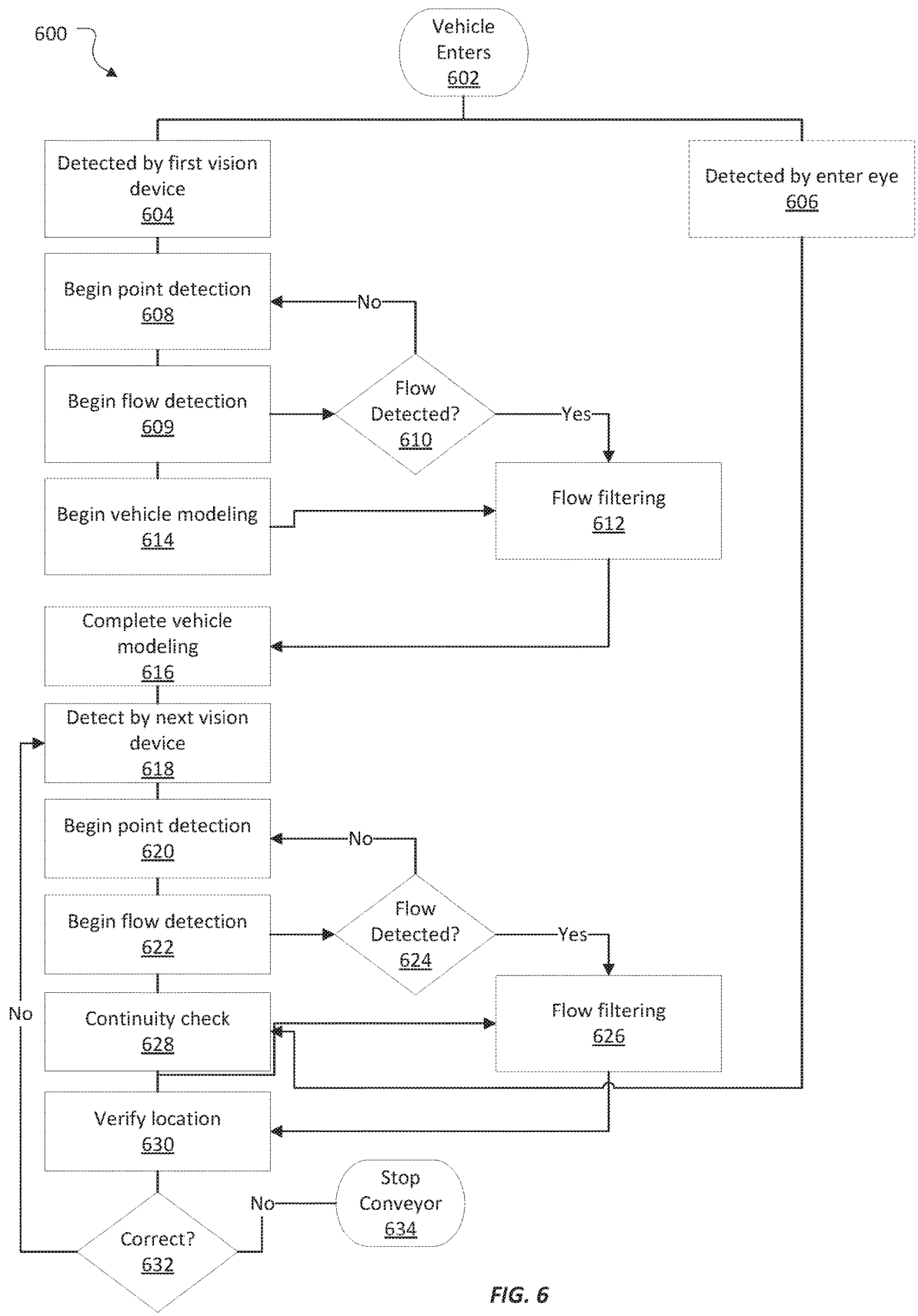
FIG. 6 is a schematic illustration of a process flow in accordance with disclosed embodiments.

FIG. 6 is a schematic illustration of a process flow 600 in accordance with disclosed embodiments. As shown, the process 600 may initiate at 602 when a vehicle 12 enters the system 10. At 604 detection by a first vision device 26 is accomplished. Optionally, at 606 detection is also made by an enter-eye, if system 10 includes such a device and such information is used to begin vehicle modeling 614.

At 608 point detection on the vehicle 12 is performed. At 609 flow detection for movement through system 10 is checked. At 610 flow detection is verified and, if flow is not detected, the process returns to point detection at 608. If flow is detected at 610, flow filtering is applied at 612. At 614 vehicle 12 modeling begins and proceeds to flow filtering 612.

After flow filtering 612, vehicle 12 modeling completes at 616. At 618 detection by the next vision device 26 in system 10 is accomplished. Again, point detection begins at 620 using the subsequent vision device 26 and flow detection begins at 622. At 624 flow is verified and, once again, if flow is not found point detection 620 is performed again. If flow is verified at 624, flow filtering is applied at 626. At 628 a continuity check is performed and proceeds to flow filtering at 626. At 630 the location of the vehicle 12 is verified. If the location is found to not be correct (e.g., FIG. 1, vehicle 12A) a stop conveyor 21 command is given as indicated at 634. In addition, the process returns to attempt detection at the next vision device 26 in the system 10. Of course, other process flows will vary according to the particularities of a given system 10 as will be apparent to those of ordinary skill in the art.

Although various embodiments have been shown and described, the present disclosure is not so limited and will be understood to include all such modifications and variations as would be apparent to one skilled in the art. The subject matter described herein can be embodied in systems, apparatus, methods, and/or articles of any desired configuration. The implementations set forth in the foregoing description do not represent all implementations consistent with the subject matter described herein. Instead, they are merely some examples consistent with aspects related to the described subject matter. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. Automotive-vehicle anti-collision system that prevents automotive-vehicle collisions within a carwash tunnel during operation, the system comprising:
   a carwash tunnel;
   an automotive-vehicle conveyor attached to the carwash tunnel and the conveyor configured to move a plurality of automotive vehicles inline along a substantially linear path through the carwash tunnel;
   automotive-vehicle washing equipment attached to the carwash tunnel and the washing equipment configured to wash automotive-vehicle exterior surfaces as an automotive vehicle moves along the substantially linear path through the carwash tunnel;
   a vision device attached to the carwash tunnel and the vision device configured to receive visual data of respective locations of a plurality of automotive vehicles within the carwash tunnel;
   a central controller configured to perform the functions of:
   controlling the conveyor to move or propel vehicles, change the conveyor speed, or to stop the conveyor;
   controlling the washing equipment;
   receiving the visual data from the vision device;
   tracking the respective positions of a plurality of automotive vehicles as the plurality of automobile vehicles move along the substantially linear path through the carwash tunnel;
   creating a modeled path of an automotive vehicle moving through the carwash tunnel via the conveyor; and
   giving a stop conveyor command if a tracked position of an automotive vehicle does not match the modeled path.

2. The system of claim 1, wherein the central controller is further configured to perform the function of providing a notification upon the occurrence of an event.

3. The system of claim 1, wherein the vision device uses LIDAR, RADAR, or SONAR.

4. The system of claim 3, wherein the central controller is further configured to perform the function of tracking the position of a specific point on an automobile as the automobile moves along the substantially linear path through the carwash tunnel.

* * * * *